United States Patent [19]
Volkrodt

[11] 3,742,268
[45] June 26, 1973

[54] INDIVIDUAL DRIVE FOR TEXTILE MACHINE SPINNING SPINDLE

[75] Inventor: Wolfgang Volkrodt, Muhlbach, Germany

[73] Assignee: Siemens Aktiengesellschaft, Berlin, Germany

[22] Filed: June 2, 1971

[21] Appl. No.: 149,260

[30] Foreign Application Priority Data
June 3, 1970  Germany.................. P 20 27 134.5

[52] U.S. Cl............. 310/68, 310/156, 310/DIG. 3, 57/100
[51] Int. Cl. ......................................... H02k 11/00
[58] Field of Search.................. 310/67, 68, DIG. 3, 310/162, 156, 10, 66; 57/100; 318/354

[56] References Cited
UNITED STATES PATENTS

| | | | |
|---|---|---|---|
| 2,474,210 | 6/1949 | Abbott | 57/100 |
| 3,095,687 | 7/1963 | Beerli | 57/100 |
| 3,492,520 | 1/1970 | Yates | 310/162 |
| 2,512,325 | 6/1950 | Hansen | 171/252 |
| 3,194,990 | 7/1965 | Kendall | 310/10 |
| 3,517,237 | 6/1970 | Lloyd | 310/162 |
| 3,590,294 | 6/1971 | Inagaki | 310/162 |
| 2,787,113 | 4/1957 | Rea | 57/100 |

*Primary Examiner*—R. Skudy
*Attorney*—Curt M. Avery, Arthur E. Wilfond, Herbert L. Lerner and Daniel J. Tick

[57] ABSTRACT

A spinning spindle of a textile machine is individually driven by a two-pole electric motor. The motor has a stator and a rotor rotatably journalled in the stator and coupled to the spindle. The stator includes a stator yoke and a flat ring winding surrounding the yoke.

2 Claims, 6 Drawing Figures

INDIVIDUAL DRIVE FOR TEXTILE MACHINE SPINNING SPINDLE

In textile technology very high rotation speeds are required for spinning spindles. When spindles are driven by belts or bands, there occur difficulties with these high speeds so that one is encouraged to develop individual drives for the spindles. For driving spindles at speeds over 10,000 rpm, two-pole motors are required which have relatively large end-turns in the stator windings. This in turn has the disadvantage that the distance between the upper spindle bearing and the center of gravity of the spindle and spool is increased by the necessary height of the motor. This increase in spacing is disadvantageous when the critical rotation speed is exceeded.

Accordingly, it is an object of my invention to reduce the above-mentioned center of gravity spacing for an individual drive to be not greater or only slightly greater than that associated with a mechanical spindle drive.

Subsidiary to this object, it is an object of my invention to provide an individual spindle drive equipped with an electric motor wherein the aforementioned spacing to the center of gravity is kept as small as possible.

According to a feature of the invention, the individual drive of a spindle is provided with a two-pole electric motor whose stator has a flat ring winding surrounding the stator yoke. By means of a ring wound stator, the motor may be configured so as to have a relatively shorter height or elevation, so that a smaller spacing of the center of gravity of the spindle and spool taken from the upper spindle bearing is possible.

The invention will now be described with reference to the accompanying drawings, wherein:

FIGS. 1 to FIG. 3 respectively illustrate a mechanical spindle drive, an individual drive using a conventional motor and a spindle drive according to the invention;

Figures 1, 2, 3:
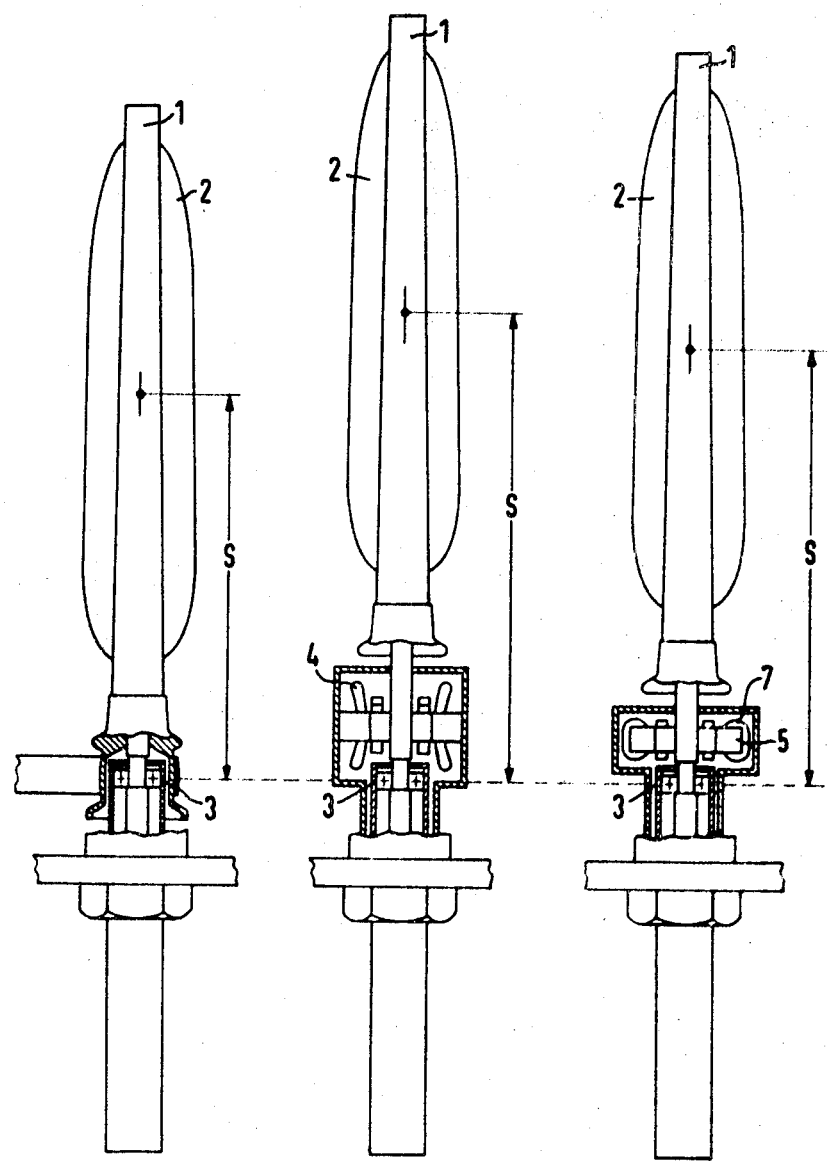

FIGS. 1 to 3 serve to mutually compare a mechanical spindle drive, individual drive equipped with a conventional motor and a spindle drive according to the invention. The spindles are designated by reference numeral 1 and the spools placed thereon by reference numeral 2. Reference numeral 3 designates the upper bearing of the spindles and the spacing from this bearing location to the center of gravity of the spindle and spool is designated by S. From FIGS. 1 to 3 it is evident that the spacing S for the individual drive equipped with the conventional motor (FIG. 2) is substantially larger than spacing for the mechanical band drive of FIG. 1 because of the construction height or elevation dimension conditioned by the larger stator winding end turns 4. With the individual drive according to the invention illustrated in FIG. 3, the elevation dimension of the motor is comparatively short because of the application of a ring wound motor stator. Consequently, the spacing S is only slightly larger than the spacing in the mechanical drive.

Figure 4:
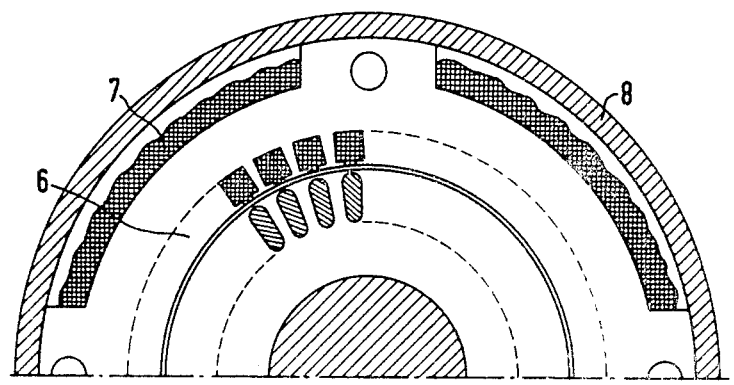
FIG. 4 is a sectional view of a two-pole asynchronous spindle drive motor.

FIG. 4 illustrates a two-pole asynchronous motor which serves as a spindle drive motor and has a stator 6 provided with a flat ring winding 7 which surrounds the stator yoke. To protect the winding, the stator is surrounded by a covering 8. The ring does not only lie in the slots of the stator, but is also wound around the stator yoke. In this way, the otherwise necessary large end turns are avoided and, accordingly, the winding is designated a flat ring winding.

Figure 5:
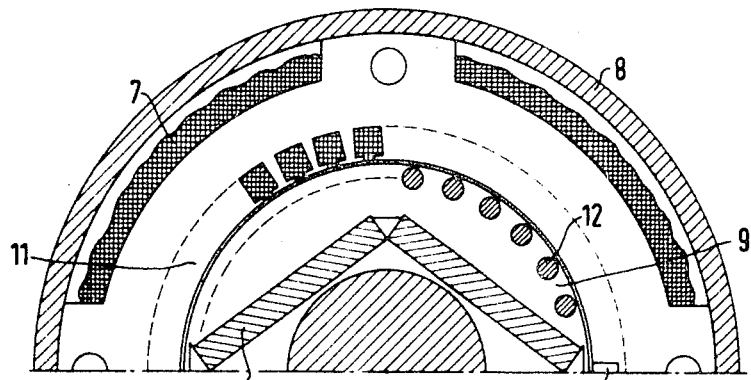
FIG. 5 is a cross-sectional view of a two-pole permanent magnet excited synchronous motor; and, FIG. 6 illustrates an elevation view of the synchronous motor of FIG. 5.
Figure 6:
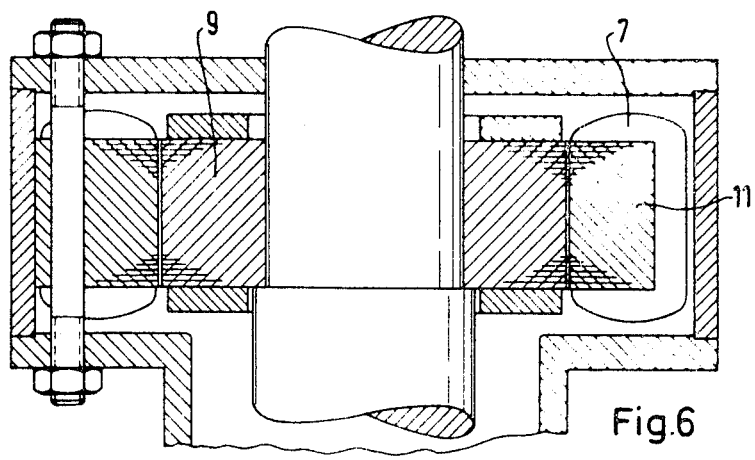

In FIGS. 5 and 6, the individual drive is comprised of a two-pole permanent magnet excited synchronous motor, that is, the rotor 9 is equipped with permanent magnets 10, while the stator 11 is again provided with a flat ring winding 7. Reference numeral 12 designates damper bars in the rotor.

One or more galvanomagnetic devices such as, for example, Hall generator 13, are arranged at the end face of the ring wound stator 11 in the vicinity of the air gap. The Hall generators 13 serve to detect the instantaneous polarity of the magnetic field of the rotor permanent magnets and the polarity change, so that the Hall generators 13 can be used to time an electronic power circuit for regulating rpm.

While the invention has been described by means of a specific example and in a specific embodiment, I do not wish to be limited thereto for obvious modifications will occur to those skilled in the art without departing from the spirit and scope of the invention.

I claim:

1. An individual drive for rotating a spindle of a textile machine, comprising a two-pole electric motor, said motor having a stator and a rotor rotatably journalled in said stator and coupled in the spindle, said stator including a stator yoke and a flat ring winding surrounding said yoke, said motor comprising permanent magnets disposed in said rotor for developing a magnetic field that moves with said rotor when the latter rotates, said rotor and said stator conjointly defining an air gap therebetween, and at least one galvanomagnetic device mounted at an end face of said stator in the vicinity of said air gap for detecting the instantaneous polarity and changes of polarity of said magnetic field.

2. An individual drive as claimed in claim 1, wherein said galvanomagnetic device is a Hall generator.

* * * * *